Patented Aug. 5, 1952

2,606,169

UNITED STATES PATENT OFFICE 2,606,169

STABILIZATION OF SULFONE RESINS

Charles Roney, Hammond, Ind., assignor to Ansul Chemical Company, Marinette, Wis., a corporation of Wisconsin No Drawing. Application February 23, 1951, Serial No. 212,519

5 Claims. (Cl. 260—30.6)

This invention relates to synthetic resins based on the product of the reaction between sulfur dioxide and an unsaturated hydrocarbon. More particularly it relates to stable or stabilized sulfone resins and to means for effecting stabilization of such resins.

The preparation of sulfone resins as such is old in the art, but heretofore these resins have always "popped," foamed up or bubbled when exposed to high temperatures, as in a mold, and they have not been satisfactorily transparent. I have now been able to make such resins which do not have these disadvantages but which, on the other hand, are clear and transparent and do not "pop" and bubble in a mold. They are resistant to high temperatures and are also easily pigmented to produce attractively colored plastic objects.

An object of the invention is therefore a stabilized sulfone resin.

Another object is a stabilizer for resins formed from sulfur dioxide and unsaturated hydrocarbons.

Another object is a sulfone resin which is resistant to high temperatures.

Another object is a transparent sulfone resin.

Other objects will become apparent as the following detailed description proceeds.

In accordance with this invention I intermix a sulfone resin and a stabilizer or stabilizers selected from one or more of the following classes:

Ketones, such as, for example:
1. Acetophenone
2. Camphor
3. Bromocamphor
4. Isophorone
5. Vanillin
6. Coumarin
7. Ethyl alpha, beta diacetyl succinate
8. Diacetyl-succinic acid
9. Butyrophenone
10. Benzophenone Mercapto derivatives, such as, for example:
1. Mercapto ethanol
2. Mercapto butanol
3. Thioglycolic acid
4. Ethyl thioglycolate
5. Mercapto propionic acid
6. Mercapto chloropropionic acid
7. Mercapto phthalic acid
8. Mercapto succinic acid
9. Mercapto vanillic acid
10. Thiosalicylic acid Esters, such as, for example:
1. Glycerol triacetate
2. Glycerol tribenzoate
3. Diethylene glycol acetate benzoate
4. Glycerol trisalicylate
5. Cresyl diglycol carbonate
6. Glucose penta-acetate
7. Sucrose octa-acetate Hydroquinones, such as, for example:
1. Hydroquinone
2. Monomethyl ether of hydroquinone
3. Monobutyl ether of hydroquinone
4. Monophenyl ether of hydroquinone
5. Tolyl hydroquinone
6. Diethyl ethyl of hydroquinone Phosphinates, such as, for example:
1. Diphenyl phenyl phosphinate
2. Diphenyl phenyl thiophosphinate
3. Diphenyl methyl phosphinate
4. Diphenyl methyl thiophosphinate
5. Dimethyl phenyl phosphinate Generally speaking, these ingredients are preferably employed in amounts from about 2% and to about 10% by weight of the resin. I have also found it advantageous to use more than 10% and even as much as 30% by weight of these stabilizers. Generally speaking, the use of less than about 5% by weight of these stabilizers will not have the desired stabilizing effect, although as little as 2% and even 1% by weight will have some beneficial effect on the transparency and clarity of the moldings.

I have found that diphenyl phenyl phosphinate and mercapto ethanol are particularly effective in producing transparent, odorless moldings.

The following are illustrative specific examples of the invention:

*Example 1*

A reaction vessel was filled with sulfur dioxide in the liquid phase, whereupon butene-2 amounting to one part for every four parts of sulfur dioxide was introduced. 0.05% by weight of potassium nitrate was added as as catalyst. The reaction was allowed to proceed for two hours. Then 10 parts by weight of acetone were added and 5 parts by weight of methanol were added further. This precipitated the resin, which was then filtered out, washed repeatedly with water, and dried. The resultant product was a white, clean, granular, resinous material, soluble in dioxane and in methylene chloride.

The resin was then mixed intimately with 10% of its weight of glycerol tribenzoate. The product thus stabilized was used for injection molding at a temperature of 200° C. and a pressure of 600 to 1000 pounds per square inch. The articles thus obtained were perfectly clear, and there was no sign of corrosion in the mold, nor sign of bubbling in the article.

This resin could not have been molded at all in the absence of the stabilizer because it would have decomposed violently and foamed up into a spongy mass.

Example 2

One part of 1-vinyl cyclohexene-3 was mixed with 5 parts of sulfur dioxide and sealed into a glass tube. The glass tube was then allowed to warm to atmospheric temperature and was allowed to stand two days. The tube was then opened and the sulfur dioxide was evaporated. The residue was allowed to dry in a vacuum. A small quantity of white resinous product was obtained.

This resin was mixed with 5% of its weight of camphor and molded with a compression molding machine, at a pressure of 600 pounds per square inch and a temperature of 200° C. It was found that stabilization was adequate to protect the material from the decomposition which would otherwise have taken place.

Example 3

One of the forms of commercial 2,4-dimethyl butadiene and sulfur dioxide condensation products was intermixed with 2% by weight of isophorone.

This material was then molded at a temperature of 250° C. and a pressure of 1000 pounds per square inch. While some decomposition took place, it was considerably less than that which took place in the absence of the isophorone. By increasing the isophorone content to 10% by weight, moldings of greater transparency were obtained.

Example 4

A resin was made from sulfur dioxide and butene-2 according to the method of Example 1. With this resin were intermixed 8% by weight of glycerol tribenzoate and 8% by weight of mercapto ethanol. The resulting material was molded at a temperature of 200° C. and a pressure of 600 pounds per square inch. Clear stable moldings were produced, with no bubbling in the mold.

Example 5

A resin was made from sulfur dioxide and pentene-2 according to the method of Example 1. This resin was mixed with 8% by weight of camphor and 8% by weight of mercapto ethanol and was molded in a transfer molding machine at 210° C. and 600 pounds per square inch pressure. Clear moldings were produced which showed no indication of decomposition during molding or when left in an oven at 80° C. for 100 hours after molding.

Example 6

A resin was made with styrene and sulfur dioxide according to the method of Example 2. With this resin were mixed 8% by weight of acetophenone and 8% by weight of thioglycolic acid and the resin was molded at a temperature of 190° C. and a pressure of 1000 pounds per square inch. Clear stable moldings were produced which did not bubble.

Example 7

A resin was made with styrene and sulfur dioxide according to the method of Example 2. This resin was mixed with 8% by weight of diphenyl phenyl phosphinate and 8% by weight of isophorone and was molded at a temperature of 160° C. and a pressure of 1000 pounds per square inch. Clear stable moldings were produced which did not bubble.

It has been found that the resins of this invention have a high degree of compatibility with inorganic pigments generally, which further attests to the high degree of stability attained. This is illustrated by the following examples.

Example 8

A resin was made from butene-2 and sulfur dioxide by the technique disclosed in Example 1, except that the catalyst consisted of lithium nitrate in conjunction with ultraviolet radiation from a mercury arc lamp. The resin was milled with the constituents set forth in the following Examples 8a to 8d, the amounts being given by weight:

Example 8a

5% camphor
5% mercapto ethanol
20% ultramarine blue

This composition gave a stable blue color in a resin readily moldable at 210° C. and 600 pounds per square inch pressure without decomposition or bubbling.

Example 8b

5% diacetyl succinic acid
10% iron oxide yellow

This product likewise gave a stable resin moldable at 210° C. and 600 pounds per square inch without decomposition or bubbling.

Example 8c

3% coumarin
2% diphenyl phosphinate
10% titanium dioxide

This material gave a product of a clear, bright, white color.

Example 8d

20% acetophenone
15% cadmium selenide

This resin gave a moldable composition of a beautiful red color.

The above examples illustrate the breadth of the invention but do not exhaust its applicability.

In addition to the olefin-sulfur dioxide resins, disclosed in the foregoing examples, made with butene-2, pentene-2, 2,4-dimethyl butadiene, 1-vinyl cyclohexene-3, styrene, and acrylonitrile, sulfone resins have been made with sulfur dioxide and other unsaturated compounds, including butene-1, pentene-1, propylene, ethylene, hexene-1, hexene-2, 2-methyl butene-2 and 2-methyl pentene-2 or mixtures thereof.

The molding temperature and pressure used with the resins of this invention are governed by the particular resin to be used and the article to be molded. Molding pressure may be as low as 25 pounds per square inch or as high as 6000 pounds per square inch to produce usable articles but is usually between 250 pounds per square inch and 3500 pounds per square inch. The molding temperature depends to some extent on the softening point of the particular resin it is desired to mold. The useful temperature has a range from about 100° C. to about 300° C., but preferred temperatures are in the range from about 150° C. to about 275° C.

While I do not wish to commit myself to any particular theory regarding the reason for the favorable results obtained, it is my belief that a concurrent plasticizing and stabilizing effect takes place, and the stabilization may depend on some partial condensation products which are removed from the reactive system by sulfur dioxide and are then dissolved in the stabilizing material present. Due to the relative specificity of the materials suitable for this purpose, it is believed that the reaction is specific to the classes of the compounds disclosed. These belong to the generic classes of mercapto derivatives, esters of dihydric alcohols, polyhydric alcohols, ketones, and hydroquinones.

Presumably all of the members of these classes are possessed of at least some stabilizing effect on the sulfone resins, their adaptability being restricted only by the general compatibility and solvent properties of such compounds. Such restrictions, however, will be obvious to the skilled chemist, who will understand the necessity for avoiding compounds which are obviously unsuitable. A compound may be obviously unsuitable either because of having a very high volatility, such as exhibited for example by acetone, a ketone, or because of extreme incompatibility or complete immiscibility with the resins.

It is thus seen that this invention is broad in scope, and is not to be restricted excepting by the claims, in which it is my intention to cover all novelties inherent in this invention as broadly as possible, in view of the prior art.

I claim:
1. An olefin-sulfur dioxide resin having incorporated therewith diphenyl phenyl phosphinate to render the resin substantially stable at a temperature above 100° C. and substantially clear and transparent under molding pressure.

2. An olefin-sulfur dioxide resin having incorporated therewith a phosphinate to render the resin substantially stable at a temperature above 100° C. and substantially clear and transparent under molding pressure.

3. An olefin-sulfur dioxide resin having incorporated therewith a diphenyl phosphinate to render the resin substantially stable at a temperature above 100° C. and substantially clear and transparent under molding pressure.

4. An olefin-sulfur dioxide resin having incorporated therewith 8% by weight of diphenyl phenyl phosphinate and 8% by weight of isophorone to render the resin substantially stable at a temperature above 100° C. and substantially clear and transparent under molding pressure.

5. An olefin-sulfur dioxide resin having incorporated therewith a phenyl phosphinate to render the resin substantially stable at a temperature above 100° C. and substantially clear and transparent under molding pressure.

CHARLES RONEY.

REFERENCES CITED

The following references are of record in the file of this patent:

UNITED STATES PATENTS

| Number | Name | Date |
|---|---|---|
| 2,481,596 | Irany et al. | Sept. 13, 1949 |